March 6, 1945.  F. J. LAPOINTE ET AL  2,371,053
BROACHING MACHINE
Filed Feb. 18, 1942  3 Sheets-Sheet 1

INVENTORS.
Francis J. Lapointe
John W. Podesta

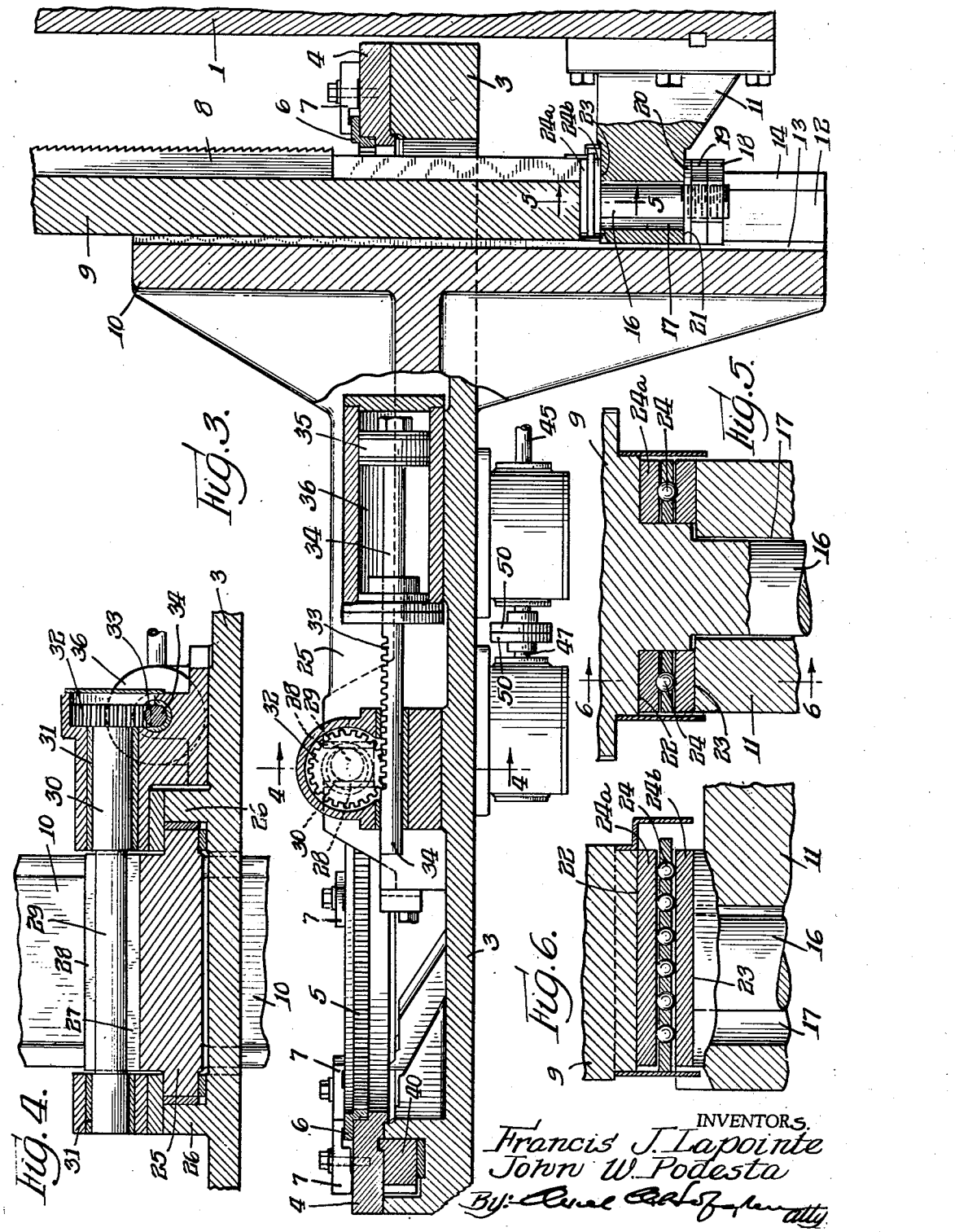

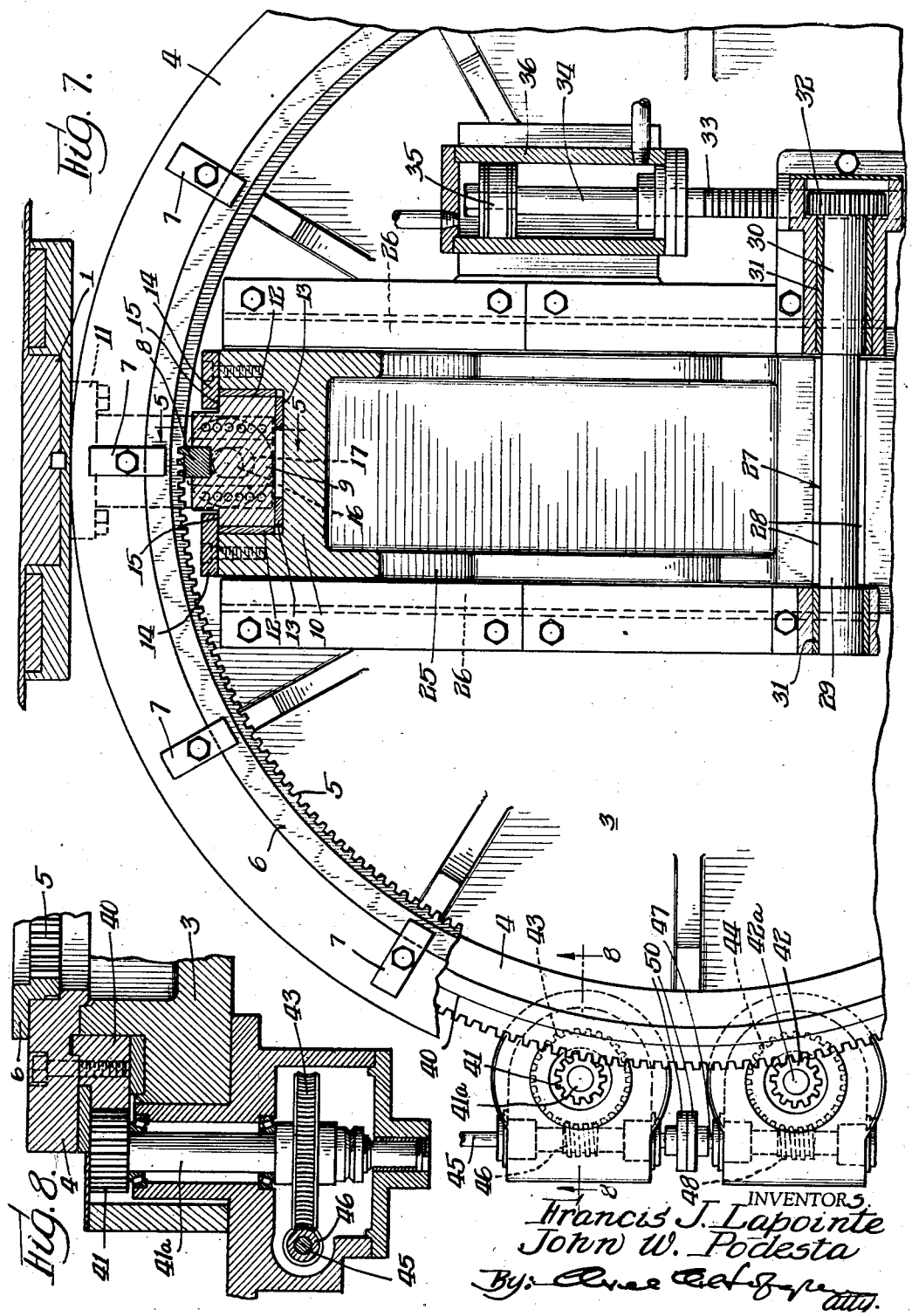

Patented Mar. 6, 1945

2,371,053

UNITED STATES PATENT OFFICE 2,371,053

BROACHING MACHINE

Francis J. Lapointe and John W. Podesta, Ann Arbor, Mich., assignors to American Broach & Machine Co., Ann Arbor, Mich., a corporation of Michigan Application February 18, 1942, Serial No. 431,424

7 Claims. (Cl. 90—10)

This invention relates to a broaching machine designed to employ a side broach and especially adapted for cutting gear teeth and performing similar operations.

One object of the invention is to provide means for shifting the broach away from its working position upon completion of its working stroke to permit indexing of the work piece in preparation for the next working stroke of the broach.

Another object of the invention is to provide a reciprocatory broach holder and a guide therefor arranged to be shifted transversely of the direction of reciprocation for withdrawing the broach holder and its broach from working position and returning them thereto.

It is also an object of the invention to provide a machine having a reciprocatory broach driving member, such as an hydraulic ram, and a broach holder mounted for reciprocative movement parallel to that of the driving member, together with a connection between them with capacity for play transversely of the driving movement, permitting the broach holder and its broach to be temporarily shifted out of working position without disengagement of the driving connection.

More specifically, it is an object of the invention to provide means for broaching the teeth of an annular gear or the like, including a reciprocatory driving member, a rotatively adjustable work support having its axis of rotation fixed in relation to the path of reciprocation of the driving member, and a broach holder guided for reciprocation in a path parallel to that of the driving member and operatively connected to said member by means which permits the broach holder and its broach to be shifted bodily toward and from a gear blank on the work support to withdraw them from working position and return them to such position, together with means for effecting a rotative indexing movement of the support while the broach is withdrawn.

Other objects and advantages of the invention will appear from the following description taken in connection with the drawings, in which:

Fig. 3 is a partial vertical section taken on a larger scale as indicated at line 3—3 on Fig. 2.

Fig. 4 is a vertical detail section taken as indicated at line 4—4 on Fig. 3.

Fig. 5 is a detail section of the supporting bearing for the broach holder, taken as indicated at line 5—5 on Fig. 3.

Fig. 6 is a detail section at line 6—6 on Fig. 5.

Fig. 7 is a partial plan view on a larger scale than Fig. 2, with some parts broken away and with some parts shown in section.

Fig. 8 is a vertical detail section at line 8—8 on Fig. 7.

Figure 1:
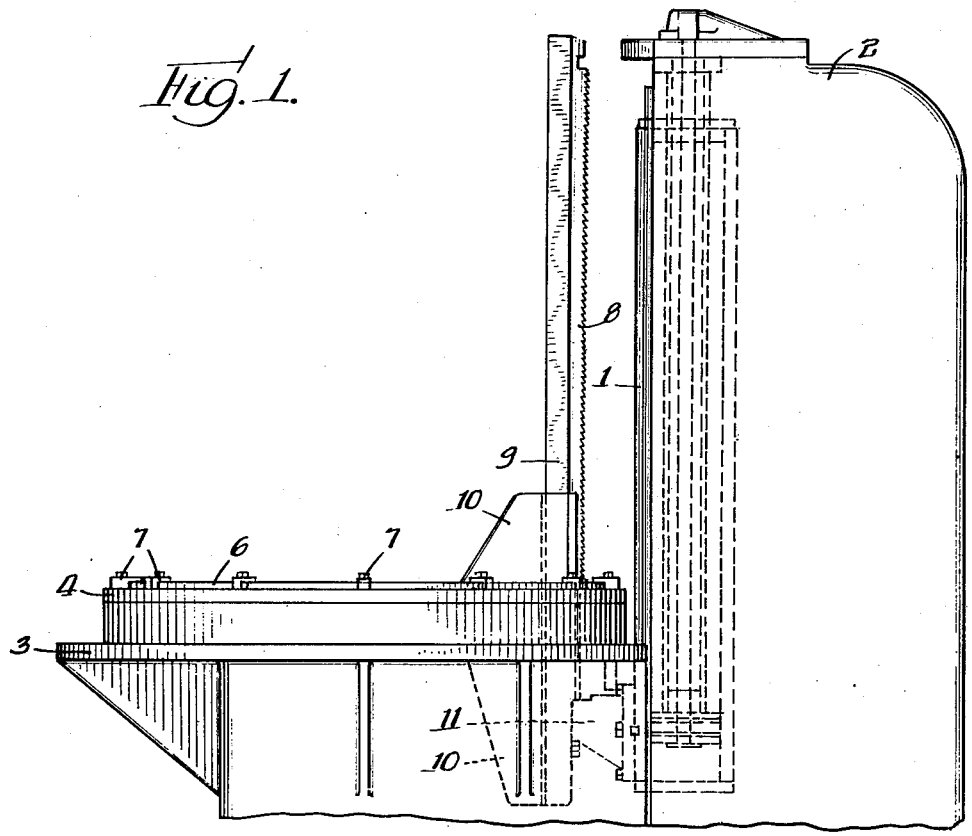
Fig. 1 is a side elevation of a broaching machine embodying this invention, with the lower or base portion broken away.
Figure 2:
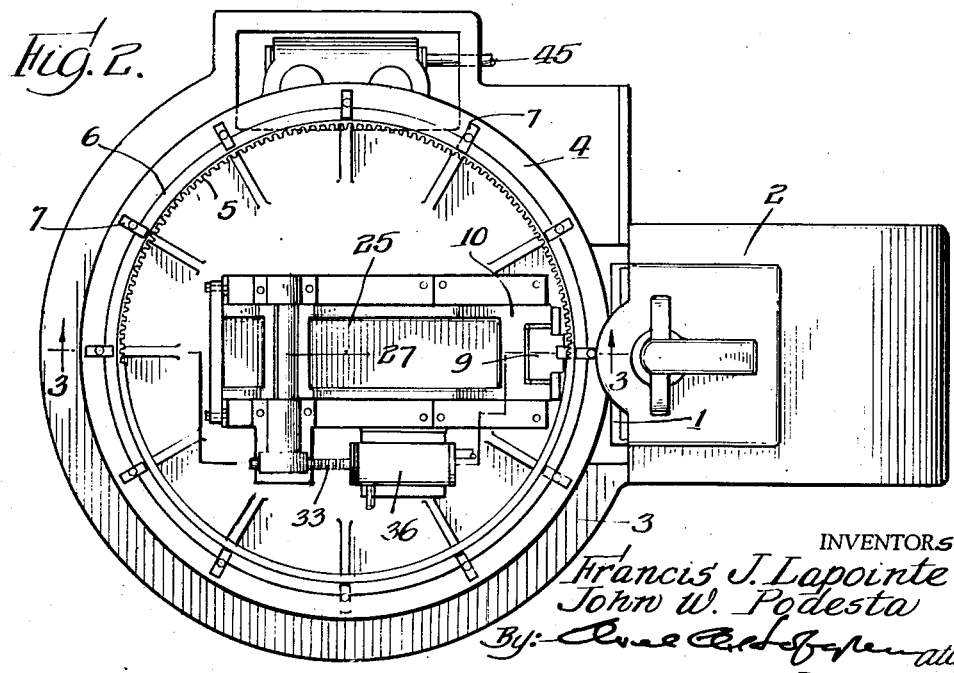
Fig. 2 is a top plan view of the machine.

While the invention is susceptible of various modifications and alternative constructions, it is shown in the drawings and will be described hereinafter in a preferred embodiment, but it is not intended that the invention is to be limited thereby to the specific embodiment disclosed, but it is intended to cover all modifications and alternative constructions falling within the spirit and scope of the appended claims.

The embodiment of this invention illustrated in the drawings is a gear broaching machine having a vertically disposed, hydraulic ram 1 mounted for reciprocation within the column 2 adjacent a work supporting table 3 on which the annular work support 4 is mounted for rotation about a vertical axis. This particular machine is designed for cutting the teeth 5 of an internal annular gear 6 which is secured to the work support 4 in any convenient manner, as by clamps 7. The side broach 8 is adapted to cut three teeth 5 in the gear blank simultaneously and to complete these teeth in a single downward stroke. This broach 8 is shown mounted on a vertically extending slide bar, hereinafter referred to as the broach holder 9, which is slidably confined in the guide channel of a guide 10, arranged to permit vertical reciprocation of the broach holder 9 and its broach 8 in a path parallel to that of the ram 1. A driving lug 11, rigidly attached to the ram 1, and projecting horizontally therefrom extends into driving engagement with the broach holder 9 at the lower end thereof.

The guideway of the part 10 is fitted with suitable wear plates 12 at the sides, with wear plates 13 engaging the back of the broach holder 9, and with cap plates 14 overlapping its forwardly facing shoulders 15 and thus confining the broach holder in the guideway. The body of the broach holder which is of T-shaped cross-section with a longitudinal channel in its front face to receive the broach 8, has a reduced terminal portion 16 of cylindrical form at its lower end, extending through an opening 17 in the driving lug 11, and the end of the terminal 16 is threaded to receive a pair of nuts 18 and 19 with a washer 20 engaging the lower face 21 of the lug 11, and thus providing a shoulder by which the driving power of the ram 1 is transmitted to the broach for its working stroke as the ram moves downward. Adjacent the reduced terminal 16 the broach holder has a shoulder 22 which rests upon the upper face 23 of the lug 11, but with ball bearings 24 interposed as shown in Figs. 5 and 6, and for a purpose which will presently be explained.

The guide 10 is formed integrally at one end of a horizontally extending carriage 25 mounted for limited horizontal movement in ways 26 provided on the work table 3 as shown in Figs. 3, 4 and 7. A transverse slot 27 formed between upstanding abutments 28, 28 on the carriage 25, provides engagement between the carriage and a crank portion 29 of a shaft 30 journaled at 31, 31 on the table 3; and said shaft has a pinion 32 meshing with the rack teeth 33 cut in the piston rod 34 extending from a piston 35 in the cylinder 36. Thus the application of hydraulic pressure to the piston 35 in the cylinder 36 moves the rod 34, rotating the pinion 32 and swinging the crank 29 through an arc which causes the carriage 25 to be shifted horizontally. The guide 10, being a part of the carriage 25, moves with it and the broach holder 9, confined in the guide 10, is thus shifted transversely of the direction of its working stroke. The extent of this shifting movement is relatively small but it is sufficient to withdraw the broach 8 clear of the gear blank 6.

By means of any suitable control devices, not shown, this withdrawal of the broach 8 may be timed to take place promptly upon completion of the working stroke of the broach, which is its downward movement. Then, with the broach withdrawn, the rotative indexing movement of the work support 4 may be effected during the return stroke of the broach—that is, while it is traveling upward in the guide 10. It may be understood that the stroke of the hydraulic piston 35 in one direction is only sufficient to turn the crank 29 through an arc of 180° or less, and that, by any suitable control means, not shown, the movement of the piston 35 will be arrested at the end of such stroke, so as to hold the guide 10, with the broach holder 9 and broach 8, at withdrawn position throughout the return travel of the broach. Preferably the indexing movement of the work support, bringing into position the next successive portion of the gear blank 6 in which teeth are to be formed by the next working stroke of the broach, will be controlled by suitable timing mechanism, not shown, but arranged to effect the movements of the machine in accordance with a predetermined cycle, such mechanism being familiar to those skilled in the art. Thus upon completion of the return stroke of the broach and the indexing movement of the work support, hydraulic pressure will again be applied to the piston 35, but this time to move it in the opposite direction, causing reverse rotation of the pinion 32 and crank 29 so as to shift the carriage 25 and move the broach 8 back into working position, ready for its downward stroke.

To permit this shifting of the broach and its broach holder 9, the driving connection with the ram 1 is provided with horizontal play by the horizontal elongation of the opening 17 in the lug 11, as seen in Fig. 7; and while the upper and lower faces of the lug are positively and accurately engaged with the broach holder 9, without substantial vertical play, the horizontal shifting movement is facilitated by the provision of the ball bearings 24 and their bearing plates 24ᵃ and 24ᵇ which sustain the weight of the broach holder bar 9 and its broach 8 upon the upper face 23 of the lug 11.

The rotative indexing movement of the work support 4 may be accomplished by any convenient mechanism. The drawings indicate a ring gear 40 which is attached to the under face of the annular work support 4 to rotate with it on the table 3. A pair of spur pinions 41 and 42 mesh with adjacent portions of the ring gear 40 and these pinions are connected by their shafts 41ᵃ and 42ᵃ with worm gears 43 and 44, respectively. A drive shaft 45 carries a worm 46 engaging the gear 43 and an aligned shaft 47 carries a worm 48 engaging the gear 44. The shafts 45 and 47 are connected by clutch members 50, 50, which permit limited relative movement between the shaft 47 and the shaft 45 when torque is applied to the shaft 45, thus taking up any backlash in the gear train and providing a substantially accurate drive for shifting the work support 4 from one working position to the next. Any suitable driving means with automatic control to determine the indexing movement may be coupled to the shaft 45 and interconnected in the cycle timing mechanism in accordance with established practice.

It will be evident that the mode of operation herein described may be readily adapted for a machine arranged to broach an external gear or segment, or a straight rack; but in the design of the machine herein shown, for producing an internal annular gear of substantial size, it is possible to secure an especially compact arrangement by disposing the movable carriage and guide for the broach holder within the annular form of the work holder and the gear blank thereon.

We claim as our invention:

1. In a gear broaching machine, an annular work support and means for securing thereon a blank for an internal, annular gear, said support being mounted for rotative indexing movement about its axis, a broach holder with a broach secured thereto, and a guide in which the holder is confined for reciprocation in a path perpendicular to the plane of the gear blank, said broach holder with its broach and guide being disposed within the circle of said gear blank, the guide being mounted for substantially radial movement with respect to the gear blank, means for so shifting the guide to withdraw the broach from the work upon completion of a working stroke, and a ram guided independently of the broach for reciprocation in a path parallel thereto and outside the circle of said gear blank, together with a constantly operative driving connection between said ram and the broach holder comprising a part on the ram engaged with a part on the broach holder and shiftable thereon only in a direction toward and from the gear blank in response to said shifting of the broach holder.

2. In a broaching machine, a ram mounted for vertical reciprocation, a horizontal work support with means to hold a work piece thereon at a fixed distance from the path of movement of the ram, a broach holder guided for reciprocation in a path parallel to that of the ram, a driving lug extending from the ram and having parallel upper and lower faces perpendicular to the direction of reciprocation, said broach holder having a reduced terminal portion with horizontal shoulders adjacent thereto, rolling bearing members interposed between said shoulders and the upper face of the driving lug on which the broach holder is carried with capacity for movement horizontally toward and from the work piece, said lug having an opening through which the reduced terminal of the broach holder extends, with threaded and shouldered means on said terminal below the lug adjustable into close sliding engagement with its lower face.

3. In a broaching machine, a ram mounted for vertical reciprocation, a horizontal work support with means to hold a work piece thereon at a fixed distance from the path of movement of the ram, a broach holder guided for reciprocation in a path parallel to that of the ram, a driving connection between said ram and broach holder comprising a part on the broach holder engaged with a part on the ram and shiftable thereon toward and from the work piece with anti-friction bearing means interposed between said relatively shiftable parts supporting the weight of the broach holder, and means effecting such shifting movement of the broach holder in timed relation to the reciprocation of the ram, said engaged parts of the ram and broach holder having opposing horizontal faces and said antifriction means comprising a rectilinear ball bearing assembly disposed between said faces.

4. In a broaching machine, a ram mounted for vertical reciprocation, a horizontal work support with means to hold a work piece thereon at a fixed distance from the path of movement of the ram, a vertical guideway extending parallel to the direction of movement of the ram with a horizontally extending portion rigid with said guideway and mounted for reciprocation toward and from the ram, a broach holder and a broach thereon mounted for movement in said vertical guideway, together with a driving connection between said ram and said broach holder comprising a part on the ram and a part on the broach holder in constant engagement but slidable horizontally upon each other, and means for reciprocating said guideway, together with the broach and broach holder mounted therein, to move the broach toward and from the ram, said means operating in timed relation to the reciprocation of the ram.

5. In a broaching machine, a ram mounted for vertical reciprocation, a horizontal work support with means to hold a work piece thereon at a fixed distance from the path of movement of the ram, a guideway member having a vertical guideway extending parallel to the direction of movement of the ram with a horizontally extending portion rigid with said guideway and mounted for reciprocation toward and from the ram, a broach holder and a broach thereon mounted for movement in said vertical guideway, together with a driving connection between said ram and said broach holder comprising a part on the ram and a part on the broach holder in constant engagement but slidable horizontally upon each other, and means for reciprocating said guideway comprising a rotatably mounted eccentric, a pair of abutments on the said rigid horizontal portion of the guideway member embracing said eccentric, a toothed gear connected to the eccentric for rotation therewtih, and a cylinder and piston device including a rack meshing with said gear and means to energize the cylinder and piston device in timed relation to the reciprocation of the ram.

6. In a broaching machine, a ram mounted for vertical reciprocation, a horizontal work support with means to hold a work piece thereon at a fixed distance from the path of movement of the ram, a broach holder and a vertically extending guideway in which it is mounted for reciprocation in a path parallel to that of the ram, a driving lug extending from the ram and having parallel upper and lower faces perpendicular to the direction of reciprocation, said broach holder having vertically spaced horizontally extending abutment shoulders in constant engagement with said upper and lower faces of the lug respectively, but slidable horizontally thereon, and means for shifting said guideway and broach holder horizontally toward and from the work support in timed relation to the reciprocation of the ram.

7. In a broaching machine, a horizontal work support, a vertically reciprocable ram mounted for travel in a path at a fixed distance from said work support, a vertically reciprocable broach holder and a guideway in which it is mounted for travel in a path spaced from that of the ram and parallel thereto, together with a drive connection between said ram and said broach holder comprising a lug on one of said parts having vertically spaced faces and a pair of vertically spaced abutments on the other part in constant engagement respectively with said spaced faces of the lug but slidable horizontally thereon, means supporting the guideway for bodily movement toward and from the work support, and means for so shifting the guideway with the broach thereon, in timed relation to the reciprocation of the ram.

FRANCIS J. LAPOINTE.
JOHN W. PODESTA.